UNITED STATES PATENT OFFICE.

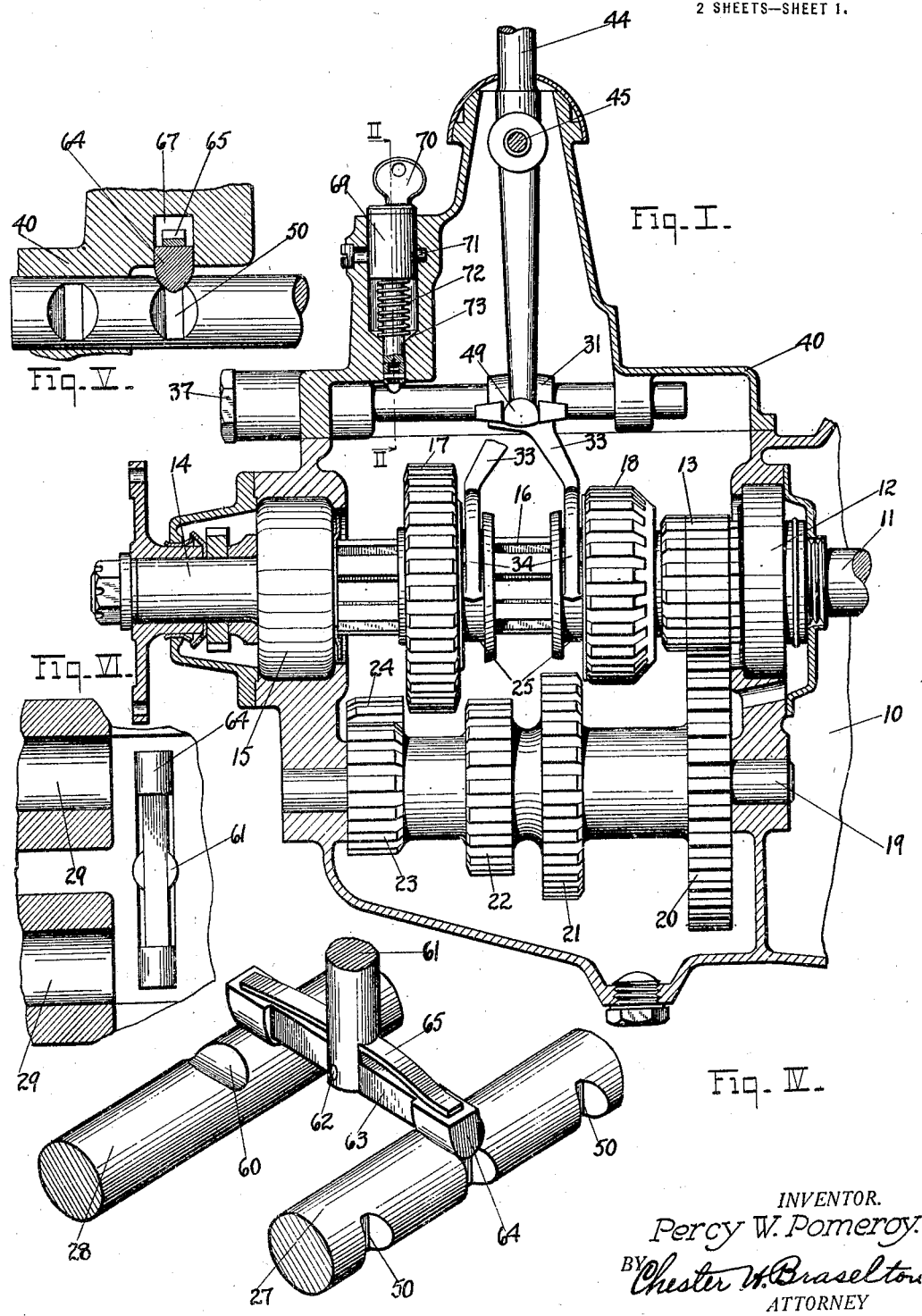

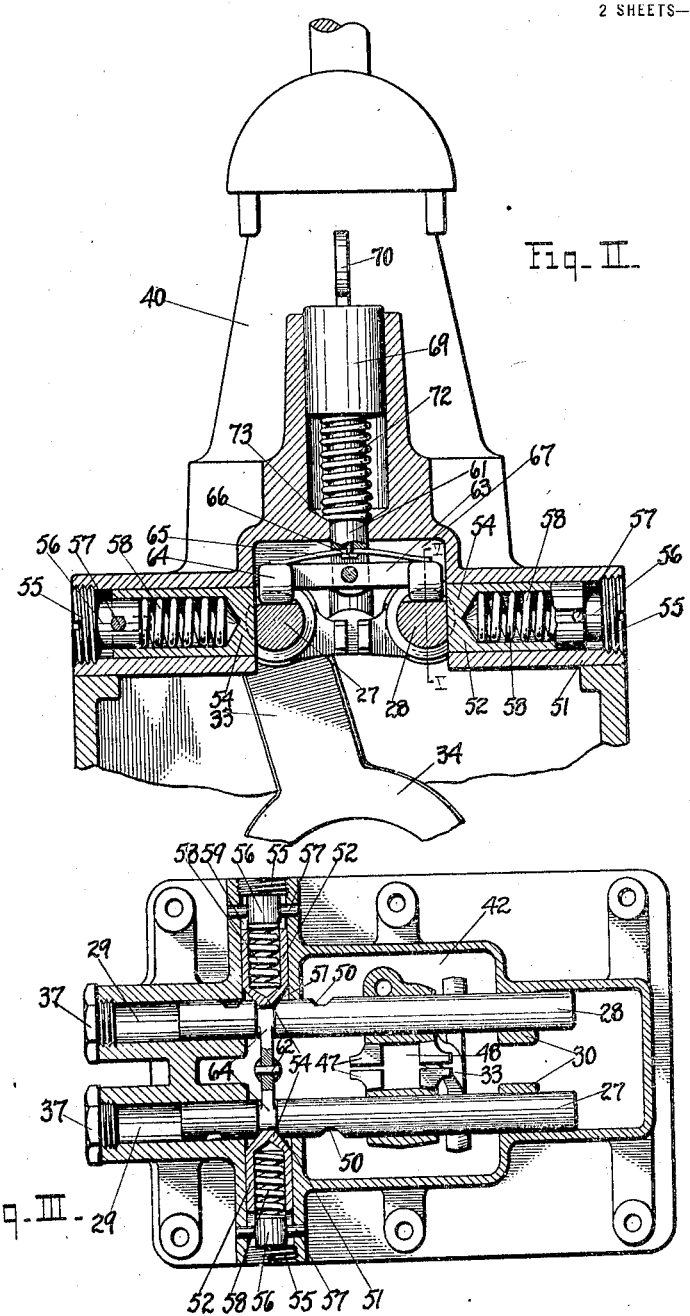

PERCY W. POMEROY, OF TOLEDO, OHIO, ASSIGNOR TO THE WILLYS-OVERLAND COMPANY, OF TOLEDO, OHIO, A CORPORATION OF OHIO.

TRANSMISSION LOCK MECHANISM.

1,410,116.   Specification of Letters Patent.   Patented Mar. 21, 1922.

Application filed July 24, 1919. Serial No. 312,910.

*To all whom it may concern:*

Be it known that I, PERCY W. POMEROY, a citizen of the United States, residing at Toledo, Lucas County, State of Ohio, have invented certain new and useful Improvements in Transmission Lock Mechanism, of which I declare the following to be a full, clear, and exact description.

This invention relates to transmission lock mechanism for automobiles, and more especially to a mechanism adapted to lock the slidable gears against movement when desired so as to prevent use of the automobile by an unauthorized person.

One object of the invention is to provide a mechanism of this character for locking the controlling devices so as to prevent movement of the slidable gears.

A further object of the invention is to provide a mechanism of the character described for positively retaining one of the movable gears in neutral position at all times.

A further object of the invention is to provide a mechanism of this character for preventing the engagement of more than one of the movable gears with one of the gears on the countershaft at any time, and at the same time providing means for locking the gear controlling mechanism.

A further object of the invention is to provide a mechanism of the character described, which is of simple construction and efficient in operation.

Further objects of the invention relate to economies of manufacture and details of construction as will hereinafter appear from the detailed description to follow.

The objects of the invention are accomplished in one instance by the devices and means described in the following specification, but it is evident that the same may be varied widely without departing from the scope of the invention as pointed out in the appended claims.

A structure constituting one embodiment of the invention, which may be the preferred, is illustrated in the accompanying drawings forming a part hereof in which:

Figure I is a vertical longitudinal section through the transmission casing of an automobile showing the relative position of the operating mechanism with respect to the transmission shaft.

Figure II is a vertical transverse sectional view through the upper portion of the transmission casing, taken along the line II—II of Figure I, illustrating the relative position of the locking mechanism and the spring pressed pawls with respect to the shifter members.

Figure III is a horizontal sectional view through the cover portion of the transmission casing, illustrating the position of the locking mechanism with respect to the shifter members.

Figure IV is a detail perspective view of the shifter members and the locking mechanism when one of the shifter members has been moved from its neutral position.

Figure V is a detail sectional view, taken along the line V—V of Figure II.

Figure VI is a detail view, partially in section, of the locking mechanism as seen from within the casing.

In the embodiment of the invention illustrated herewith, 10 indicates a transmission casing of the conventional type having a driving element or power shaft 11 extending within the casing, and rotatably mounted in a bearing 12 positioned in one end thereof. The driving element or power shaft is adapted to be operatively connected with an engine (not shown), and carries a driving pinion 13 firmly secured thereto within the casing. A drive shaft 14 is rotatably mounted in a bearing 15 carried by the casing, and is so positioned as to be in axial alignment with the power shaft 11. The end of the driven shaft 14 which extends within the transmission casing is provided with a plurality of splines 16 so arranged as to permit movement of the movable gears 17 and 18 carried by the drive shaft in a direction longitudinally of the shaft, and at the same time prevent rotation of these gears with respect to the shaft. A countershaft 19 is also mounted in bearings carried by the casing, and is positioned substantially parallel to the longitudinal axis of the drive shaft 14. A plurality of gears 20, 21, 22 and 23 are firmly secured to the countershaft and rotated therewith. The gear 20 is continually in mesh with and constantly driven by the pinion 13 secured to the end of the power shaft. The gears 21, 22 and 23 are thus constantly rotated from the driving pinion 13. A gear 24 is carried by a fixed shaft (not shown) and is constantly in mesh with and continually rotated by the gear 23 carried by the countershaft.

The movable gears 17 and 18 are each provided with a shifting collar 25 for engagement by the shifting arms, whereby the said gears may be moved in a direction longitudinally of the drive shaft. The pinion 13 is adapted to be constantly rotated by the movement of the power shaft 11, thus communicating rotative movement to the gear 20 and the countershaft 19 together with the gears 21, 22 and 23 carried by the countershaft, and the gear 24 which is constantly in mesh with the gear 23. The gears 17 and 18 are shown in Fig. I as occupying their neutral position, in which they are out of mesh with the gears carried by the countershaft and so positioned that the power shaft rotates freely without communicating rotative movement to the drive shaft. When the movable gear 18 is moved forwardly into close engagement with the pinion 13 clutch mechanism (not shown) is provided for securing driving engagement between the adjacent faces of the gear 18 and the pinion 13, whereby the drive shaft is directly operated from the power shaft. If, however, the movable gear 18 is moved rearwardly a sufficient distance, it will be placed in mesh with the gear 21 carried by the counter-shaft, whereby rotative movement may be imparted to the drive shaft from the power-shaft through the countershaft 19, and in the same direction as by engagement of the gear 18 with the driving pinions 13 but at a lower speed. If the movable gear 17 is moved in a forward direction, it is placed in mesh with the gear 22 carried by the countershaft, whereby rotative movement is imparted to the drive shaft through the countershaft, in the same direction as the rotative movement imparted to the shaft by means of the gear 18 but at a lower rate of speed, as will be evident from comparing the relative sizes of the gears 17 and 22. If, however, the movable gear 17 is moved in the opposite direction, towards the rear, it will be placed in mesh with the gear 24 whereby rotative movement will be imparted to the drive shaft in a direction opposite to that in which it would be rotated under the several conditions previously described.

The mechanism previously described comprises the conventional form of transmission mechanism commonly employed in automobiles, so arranged as to enable the drive shaft to be rotated at various degrees of speed, and also making it possible to reverse the direction of rotation of the drive shaft when desired. It is obvious that serious difficulties would be encountered if through accident or otherwise the movable gears 17 and 18 should both be placed in mesh at the same time with one of their intermeshing gears. It is highly desirable therefore, to provide mechanism which will retain one of these gears in neutral position whenever the other gear is moved from neutral position and to retain the gear which has been moved in its proper meshing position and thus prevent its accidental disengagement from the gear with which it is placed in mesh. Moreover, it is desirable to provide means for locking both gears in neutral position whereby, any movement of either gear from such position can be prevented thus preventing the gears from being placed in engagement for operating the automobile when the gears are locked. In order to provide mechanism for thus retaining one or both of the gears from accidental movement at all times, a pair of longitudinally slidable rods 27 and 28 are slidably mounted in oppositely positioned registering bearings 29 and 30 formed in the base portion of the casing cover. The longitudinally slidable rods are so positioned as to extend substantially parallel with each other at all times, and be capable of move-movement in substantially parallel paths.

Each of these rods has firmly secured thereto a split collar 31, the parts of which are firmly clamped to each of the rods by means of suitable securing devices, each of said collars 31 being provided with a downwardly extending arm 33 having forked ends 34 adapted to partially embrace one of the shifting collars 25 to control the movement of one of the movable gears. The split collars 31 together with downwardly extending arms 33 and the forks 34 are of similar construction and are so arranged that they each control one of the gears 17 and 18. Screw caps 37 are adapted to be firmly secured in the ends of the bearings 29 formed in the casing, for the purpose of properly enclosing the bearings 29 to prevent foreign matter from becoming lodged therein. A recess 42 is formed in the casing cover for the purpose of permitting free movement of the collars 31 and their associated parts in a direction longitudinally of the casing.

The casing cover 40 is secured to the upper surface of the main transmission casing by means of a plurality of bolts or other suitable fastening means which serve to firmly secure the casing cover and the mechanism carried thereby securely in position relative to the operating parts of the transmission mechanism. A control lever 44 is pivotally mounted at 45 in an upwardly extending portion of the casing cover so that the control lever pivots freely on the point 45. The split collars 31 are oppositely positioned upon the rods 27 and 28, each of said collars being provided with a pair of inwardly extending ears 47, so positioned as to provide oppositely extending registering slots 48. The control lever 44 is provided with a squared portion 49 at its lower end, which is positioned within the space formed by the oppositely extending slots 48 so as to control the movement of the longitudinally slidable rods 27 and 28 by exerting pressure against the ears 47. The control lever 44 is mounted so that the lower end thereof is capable of movement in a direction longitudinally of the casing, and is also capable of a slight movement in a transverse direction within the slots 48.

Each of the longitudinally movable rods is provided with a plurality of depressions or grooves 50 formed near one end thereof, and spaced from each other longitudinally of the rods for a purpose which will now be described. In the present instance the grooves or depressions formed in each rod are three in number, and the several grooves are of substantially the same depth. Transversely extending openings 51 are formed within the casing cover in the same horizontal plane with the bearings 29 and 30 provided for the longitudinally slidable rods. A pawl mechanism 52 is adapted to be positioned within each of the transverse passages 51 so as to register with the grooves or depressions 50 formed in the outer side portions of the slidable rods 27 and 28. Each of the pawls 52 is adapted to slide freely within one of the passages 51, and is provided with a wedge shaped end portion, the point 54 of which is so positioned as to fit within one of the grooves or depressions formed in one of the longitudinally slidable rods. A screw cap 55 inserted within the outer end of each of the passages 51 to entirely close the same, each of the caps being provided with an inwardly projecting portion 56, and a pin 57 is passed through registering openings formed in the wall of the bearing and the portion 56 of the cap 55 to firmly hold the cap 55 in position after it is inserted within the passage 51. Each of the pawls 52 is provided with a hollow interior portion within which is positioned a coil compression spring 58, one end of which bears against the pawl 52 while the opposite end thereof bears against the inwardly projecting portions 56 of the caps 55 in such a manner as to constantly force the pawl 52 into engagement with one of the longitudinally slidable rods. Each of the pawls 52 is provided with a pair of oppositely positioned grooves 59 extending longitudinally thereof and so located as to be guided by the oppositely extending end portions of the pin 57 to control the movement of the pawl and prevent its rotation within the passage 51.

Each of the grooves 50 is so positioned in the corresponding slidable rods as to determine the position of the slidable rod and the gear co-operative therewith, and in its neutral position, and the pawls serve to frictionally engage the sliding rods to prevent accidental displacement of either of the said rods. When the middle groove or depression of each rod is in engagement with the slidable pawl 52 co-operating therewith, the slidable rod is in its neutral position as is also the gear which is controlled thereby.

The mechanism for interlocking the shifter members, or rods to prevent movement of both members from their neutral position at the same time, and to provide means for positively locking both members in neutral position whereby the operation of the automobile by any unauthorized person is prevented will now be described. Each of the shifter rods or members is provided with a stop or groove 60 formed upon the upper surface thereof positioned substantially opposite the middle groove formed in the side of the rod, and these stops are adapted to be engaged by a member for the purpose of providing an interlock to prevent movement of one rod from its neutral position when the other rod is moved from its neutral position, and to provide means for positively locking both rods in neutral position to prevent operation of the automobile. The mechanism provided for the purpose of accomplishing the double function of an interlock to prevent movement of both rods from their neutral position at the same time, and to lock both rods securely in neutral position comprises a substantially vertically positioned plunger 61 mounted within the cover portion of the transmission casing so as to be capable of a slight degree of reciprocation therein. Pivotally supported as at 62 upon the lower end portion of the plunger 61 is a transversely extending rocker arm 63 provided with suitably formed end portions 64 which are adapted to engage the stops 60 formed in the shiftable members when the two shifter members are in neutral position. A leaf spring 65 is suitably secured to the plunger 61 by means of a screw 66, and the oppositely extending portions of the springs are adapted to bear against the upper surface of the rocker arm and exert pressure thereagainst so as to insure the opposite end portions 64 of the rocker arm being pressed into engagement with the stops 60. A transversely extending recess 67 is formed in the lower surface of the casing cover and provides a chamber for the reception of the transverse rocker arm 63, the chamber being formed to permit slight vertical movement of the rocker arm. The plunger 61 is reciprocally mounted in an opening formed in the upper portion of the casing cover and is provided at the upper end portion thereof with an enlarged portion 69 within which is housed suitable key actuated mechanism for locking the plunger in depressed position. This key actuating mechanism is capable of being operated by the removable key 70 so as to force a bolt 71 into engagement with a suitable depression formed in the casing for retaining the plunger in depressed position. A spring 72 surrounds the lower portion of the plunger, the said spring bearing at its lower end against a shoulder 73 formed in the casing, the upper end portion of the coil spring bearing against the enlarged portion 69 of the plunger for the purpose of forcing the plunger upwardly to the extent of its upward movement when the bolt 71 is withdrawn from the recess in the casing. When the plunger 61 is in its lower or depressed position both end portions of the rocker arm is positioned within the stops 60 and pressed into close engagement wherewith to positively prevent movement of either of the shifter members from their neutral position. When the plunger 61 is at its upper limit of movement the rocker arm 63 is raised sufficiently from the stops formed in the shifter members so as to permit the movement of one shifter member, thereby causing that end portion of the rocker arm in proximity to the other shifter member to be forced into the stop 60 formed in that shifter member and thus provide interlocking means for preventing both shifter members being moved from neutral position at the same time. When the first named shifter member has been returned to its neutral position the second shifter member can then be moved from neutral position, and as this second shifter member is moved from neutral position the end portion 64 of the rocker arm which is in proximity therewith rides up upon the upper surface of the shifter member and thereby forces the opposite end portion of the rocker arm into engagement with the stop 60 formed in the first named shifter member whereby movement of the first named shifter member from its neutral position is prevented until the second named shifter member is returned to neutral position.

It will be seen from the above description that the mechanism above described provides an interlock between the shifter members whereby each member is locked against movement from its neutral position during movement of the other member from neutral position, and when the plunger 61 is locked in its depressed position both shifter members are positively locked in neutral position and prevented from movement therefrom, thus providing means for positively preventing the operation of the automobile at such times as the plunger 61 is locked in its depressed position.

While I have shown and described in considerable detail a specific embodiment of my invention, it is to be understood that this showing and description is illustrative only and for the purpose of rendering my invention more clear, and that I do not regard the invention as limited to details of construction illustrated or described, nor any of them, except in so far as I have included such limitations within the terms of the following claims, in which it is my intention to claim all novelty inherent in my invention broadly as well as specifically.

What I claim as new and desire to secure by Letters Patent is:

1. In combination with a transmission mechanism, a pair of sliding gears, a pair of shifter members movable in parallel paths and provided with means for engaging the gears to move the same each of said members being provided with a stop, a plunger having one end extending into proximity with the said members, a pivoted rocker arm carried by the said plunger for engagement with the stops, and means for locking the plunger in depressed position for locking both members against movement.

2. In a device of the class described, a pair of members movable in parallel paths each of said members being provided with stops, a reciprocable plunger, means pivotally supported by the plunger for engaging the stops, and means for locking the plunger in depressed position whereby both members are locked against movement.

3. In a device of the class described, a pair of members movable in parallel paths each of said members being provided with a stop, a reciprocable plunger having a portion extending to a point intermediate said movable members, and means pivotally supported by the plunger for engaging the stops to form an interlock between the two members.

4. In a device of the class described, a pair of members movable in parallel paths each of said members being provided with a stop, a plunger having a portion extending to a point intermediate said movable members, means pivotally supported by the plunger for engaging the stops to form an interlock between the two members and means for locking the plunger in depressed position whereby both members are locked against movement.

5. In a device of the class described, a pair of members movable in parallel paths each of said members being provided with a stop, a plunger having a portion extending to a point intermediate the movable members, means pivotally supported by the plunger for engaging the stops, and means for locking the plunger in depressed position whereby both members are locked against movement.

6. In a device of the class described, a pair of members mounted for relative movement each of said members being provided with a stop, a reciprocable plunger, a member pivotally mounted upon the plunger and having its opposite end portions engaging with the stops to form an interlock between the two members.

7. In a device of the class described, a pair of members mounted for relative movement each of said members being provided with a stop, a plunger, a member pivotally mounted upon the plunger and having its opposite end portions engageable with the stops, and means for locking the plunger in depressed position whereby both members are locked against movement.

8. In combination with a transmission mechanism, a pair of shifter members mounted for sliding movement relative to each other, each member being provided with a stop, means positioned in proximity to the shifter member for pivotally supporting a rocker arm, said rocker arm being provided with portions adapted to engage with the stops upon the shifter members and means to lock said rocker arm in engagement with said stops when said shifter members are in neutral.

9. In combination with a transmission mechanism, a pair of shifter members mounted for sliding movement relative to each other each member being provided with a stop, a rocker arm pivotally mounted adjacent the shifter members and provided with portions adapted to engage with the stops upon the shifter members, and means for bodily moving the rocker arm for locking the shifter members against movement.

10. In combination with a transmission mechanism, a pair of shifter members mounted for sliding movement relative to each other each member being provided with a stop, and a rocker arm pivotally mounted adjacent the shifter members and extending transversely thereof, said rocker arm being provided with portions adapted to engage with the stops upon the shifter members for providing an interlock therebetween, and means for preventing pivotal motion of said rocker arm.

11. In a device of the class described, a pair of shifter members movable relative to each other and each provided with a stop, a reciprocable member positioned adjacent said shifter members, a rocker arm pivoted to said reciprocable member at a point intermediate its ends and having portions adjacent its ends adapted to engage the stops on the shifter member, and resilient means for urging one end of the rocker arm into engagement with the stop on one of the shifter members when the other shifter member is shifted.

12. In a device of the class described, a pair of shifter members movable relative to each other and each provided with a stop, a depressible member positioned adjacent said shifter members, a rocker arm pivoted to said depressible member at a point intermediate its ends and having portions adjacent its outer ends adapted to engage the stops on the shifter members, resilient means for urging one end of the rocker arm into engagement with the stop on one of the shifter members when the other shifter member is shifted, and means for locking the depressible member in its depressed position and thereby locking both shifter members against movement.

13. In combination with a transmission mechanism, a pair of members movable in parallel paths each of said members being provided with stops, a reciprocable plunger, means pivotally supported by the plunger for engaging the stops, and means for locking the plunger in depressed position whereby both members are locked against movement.

14. In combination with a transmission mechanism, a pair of members movable in parallel paths each of said members being provided with a stop, a casing adjacent to said members having a recess therein extending transversely of said members, and a bodily movable member positioned in the slot formed in the casing and resiliently mounted to ride over one member and to engage the stop on the other movable members and also to engage both stops simultaneously to form an interlock between said movable members.

15. In a locking mechanism, a pair of members movable in parallel paths each of said members being provided with a stop, a member rigidly supported adjacent to said movable members and provided with a slot extending transversely thereof and adapted to register with the stops on said members in certain positions of said members, and a slidable member having a detent means pivoted thereon positioned in said slot, said detent means being adapted to engage the stops upon said movable members to form an interlock between said movable members.

16. In a locking mechanism, a pair of members movable in substantially parallel paths and each provided with a stop, a rigid member adjacent to said movable members provided with a recess extending transversely of said members, a reciprocable plunger extending within said recess, and detent means pivotally supported by the plunger and positioned within the recess for engaging the stop to form an interlock between said movable members.

17. In combination with a transmission mechanism, a pair of shifter members mounted for sliding movement relative to each other, each member being provided with a stop, and a rocker arm pivotally mounted adjacent the shifter members and extending transversely thereof, said rocker arm being provided with a portion adapted to engage one stop and positively locking the corresponding shifter member while the stop on the other shifter member is moved out of engagement with said rocker arm, and means to lock said rocker arm in engagement with said stops when the stops are in alignment with the rocker arm.

18. In combination with a transmission mechanism, including a pair of shifter members each of which is provided with a stop, pivoted detent means adapted to engage the stop in one of the shifter members and lock the same in neutral while the other shifter member is out of neutral, and means capable of preventing motion of said pivoted detent means when both stops are engaged thereby.

19. In combination with a transmission mechanism including a pair of shifter members, each of which is provided with a stop, detent means adapted to engage the stop in one of the shifter members, and lock the same in neutral while the other shifter member is out of neutral, and means to lock said detent means in engagement with both stops when said shifter members are in neutral.

20. In a transmission mechanism, a pair of sliding gear shifters, a stop on each of said shifters, means for automatically retaining one shifter in neutral while the other is out of neutral, and manually movable means for causing said first named means to lock both shifters in neutral position.

21. In a transmission mechanism, a pair of sliding gear shifters, a stop for each of said shifters, means for automatically retaining one shifter in neutral while the other is out of neutral, said means being adapted also to retain both shifters in neutral, and means for locking said first named means in the latter position.

In testimony whereof, I affix my signature.

PERCY W. POMEROY.